United States Patent
Chandra Mohan et al.

(10) Patent No.: US 11,290,422 B1
(45) Date of Patent: Mar. 29, 2022

(54) PATH-AWARE NAPT SESSION MANAGEMENT SCHEME WITH MULTIPLE PATHS AND PRIORITIES IN SD-WAN

(71) Applicant: Ciena Corporation, Hanover, MD (US)

(72) Inventors: Vijay Mohan Chandra Mohan, San Jose, CA (US); Prasanth Gajarampalli, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 7 days.

(21) Appl. No.: 17/113,737

(22) Filed: Dec. 7, 2020

(51) Int. Cl.
   *H04L 29/12* (2006.01)
   *H04L 61/256* (2022.01)
   *H04L 67/1097* (2022.01)

(52) U.S. Cl.
   CPC ........ *H04L 61/256* (2013.01); *H04L 67/1097* (2013.01)

(58) Field of Classification Search
   None
   See application file for complete search history.

(56) References Cited

U.S. PATENT DOCUMENTS

| 10,164,873 B1 | 12/2018 | Sood et al. |
| 10,257,061 B2 * | 4/2019 | Menon ................ H04L 43/0811 |
| 2017/0346787 A1 * | 11/2017 | Menon .................... H04L 45/38 |

FOREIGN PATENT DOCUMENTS

| CN | 111741039 A | * 10/2020 | |
| WO | WO-2017119950 A1 | * 7/2017 | ......... H04L 12/4625 |

* cited by examiner

*Primary Examiner* — Natisha D Cox
(74) *Attorney, Agent, or Firm* — Clements Bernard Baratta; Lawrence A. Baratta, Jr.; Christopher L. Bernard

(57) ABSTRACT

Systems and methods include, responsive to routing a packet to a destination via an external interface of a plurality of external interfaces, receiving the packet; checking if the packet belongs to an existing session for network address and port translation based on a session key; if the packet does not belong to the existing session, assigning the packet an Internet Protocol (IP) address and port based on the routing; if the packet belongs to the existing session, checking if an active path has changed, and, if not, performing the network address and port translation based on the session; and, if the active path has changed, assigning the packet an Internet Protocol (IP) address and port based on another external interface associated with the changed active path.

20 Claims, 8 Drawing Sheets

PATH-AWARE NAPT SESSION MANAGEMENT SCHEME WITH MULTIPLE PATHS AND PRIORITIES IN SD-WAN

FIELD OF THE DISCLOSURE

The present disclosure generally relates to networking. More particularly, the present disclosure relates to systems and methods for path-aware Network Address and Port Translation (NAPT) session management scheme with multiple paths and priorities, such as for use in Software-Defined Wide Area Networking (SD-WAN).

BACKGROUND OF THE DISCLOSURE

Network Address Translation (NAT) includes remapping an Internet Protocol (IP) address space into another by modifying network address information in the IP header of packets while they are in transit across a traffic routing device, i.e., a router. NAPT also includes remapping the port as well. NAPT performs session management in the router where a new packet is assigned a session with the appropriate IP address from a pool of IP addresses and source ports. Each subsequent packet utilizes the assigned IP address and source port. SD-WAN relates to Software-Defined Networking (SDN) in a Wide Area Network (WAN) and utilizes SDN techniques that decouple hardware resources from the software control. A router, Virtual Network Function (VNF), etc. in SD-WAN can support many-to-many NAT/NAPT where there are multiple ports on an internal network and multiple ports on an external network. A NAT session maintains the public IP address assigned to the port facing the external network and an active path can change for packet to egress on a different port of the router to reach the external network. Here, the session continues to pick a stale IP address of an earlier egress port when the active path to external network changes causing network reachability issues and other inconsistencies in SD-WAN where paths have priorities. There is a need to change the assigned IP address for this session in this scenario, and the session management should converge only for the affected NAPT sessions, without user intervention.

BRIEF SUMMARY OF THE DISCLOSURE

The present disclosure relates to systems and methods for path-aware Network Address and Port Translation (NAPT) session management scheme with multiple paths and priorities, such as for use in Software-Defined Wide Area Networking (SD-WAN). The present disclosure includes intelligent and dynamic session management performance in an SD-WAN scenario where a destination node can be reached via multiple paths having its own routing priority. The present disclosure includes a session management scheme that explains how the NAPT sessions can converge when there is a change in path/reachability to the destination. The session management scheme works in association with the address and port allocation process, which picks an appropriate public source address based on the egress interface. The session management scheme works seamlessly without any user intervention and yet have the sessions reflect the change in the path to reach the destination. The present disclosure is efficient, i.e., requires no additional memory, dynamically converges without intervention, and is deployable on any SD-WAN platform.

In an embodiment, a non-transitory computer-readable medium includes instructions stored thereon for programming a device to perform steps of, responsive to routing a packet to a destination via an external interface of a plurality of external interfaces, receiving the packet; checking if the packet belongs to an existing session for network address and port translation based on a session key; if the packet does not belong to the existing session, assigning the packet an Internet Protocol (IP) address and port based on the routing; if the packet belongs to the existing session, checking if an active path has changed, and, if not, performing the network address and port translation based on the session; and, if the active path has changed, assigning the packet an Internet Protocol (IP) address and port based on another external interface associated with the changed active path.

The steps can further include maintaining a list of IP addresses as a pool. The checking if the active path has changed can include comparing the external interface in the session with the external interface from the routing with a mismatch indicative of the changed active path. The steps can further include, if the active path has changed for a second existing session and if no subsequent packets are received for the second session, performing no action on the second existing session until it is stale. The active path can be changed based on any of a link being down and a new preferred path being determined in the routing. The device can be a Software-Defined Wide Area Networking (SD-WAN) routing device. The SD-WAN routing device can be a many-to-many device having a plurality of internal interfaces and the plurality of external interfaces. The SD-WAN routing device can be a one-to-many device having an internal interface and the plurality of external interfaces. The SD-WAN routing device can be a many-to-one device having a plurality of internal interfaces and one active interface of the plurality of external interfaces.

In another embodiment, a method includes, responsive to routing a packet to a destination via an external interface of a plurality of external interfaces, receiving the packet; checking if the packet belongs to an existing session for network address and port translation based on a session key; if the packet does not belong to the existing session, assigning the packet an Internet Protocol (IP) address and port based on the routing; if the packet belongs to the existing session, checking if an active path has changed, and, if not, performing the network address and port translation based on the session; and, if the active path has changed, assigning the packet an Internet Protocol (IP) address and port based on another external interface associated with the changed active path.

The method can further include maintaining a list of IP addresses as a pool. The checking if the active path has changed can include comparing the external interface in the session with the external interface from the routing with a mismatch indicative of the changed active path. The method can further include, if the active path has changed for a second existing session and if no subsequent packets are received for the second session, performing no action on the second existing session until it is stale. The active path can be changed based on any of a link being down and a new preferred path being determined in the routing. The method can be implemented via a Software-Defined Wide Area Networking (SD-WAN) routing device.

In a further embodiment, an apparatus includes one or more internal interfaces; a plurality of external interfaces; a routing block connected to the one or more internal interfaces; and a network address and port translation block connected to the routing block and the plurality of external interfaces, wherein the network address and port translation block is configured to responsive to routing, by the routing block, a packet to a destination via an external interface of a plurality of external interfaces, receive the packet, check if the packet belongs to an existing session for network address and port translation based on a session key, if the packet does not belong to the existing session, assign the packet an Internet Protocol (IP) address and port based on the routing, if the packet belongs to the existing session, check if an active path has changed, and, if not, perform the network address and port translation based on the session, and, if the active path has changed, assign the packet an Internet Protocol (IP) address and port based on another external interface associated with the changed active path.

The network address and port translation block can be further configured to maintain a list of IP addresses as a pool. The active path can be changed based on comparing the external interface in the session with the external interface from the routing with a mismatch indicative of the changed active path. The network address and port translation block can be further configured to, if the active path has changed for a second existing session and if no subsequent packets are received for the second session, performing no action on the second existing session until it is stale. The active path can be changed based on any of a link being down and a new preferred path being determined in the routing.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for path-aware Network Address and Port Translation (NAPT) session management scheme with multiple paths and priorities, such as for use in Software-Defined Wide Area Networking (SD-WAN). The present disclosure includes intelligent and dynamic session management performance in an SD-WAN scenario where a destination node can be reached via multiple paths having its own routing priority. The present disclosure includes a session management scheme that explains how the NAPT sessions can converge when there is a change in path/reachability to the destination. The session management scheme works in association with the address and port allocation process, which picks an appropriate public source address based on the egress interface. The session management scheme works seamlessly without any user intervention and yet have the sessions reflect the change in the path to reach the destination. The present disclosure is efficient, i.e., requires no additional memory, dynamically converges without intervention, and is deployable on any SD-WAN platform. That is, the present disclosure dynamically detects a path switchover (routing) and includes convergence of only the affected NAPT sessions without user intervention.

Figure 1:
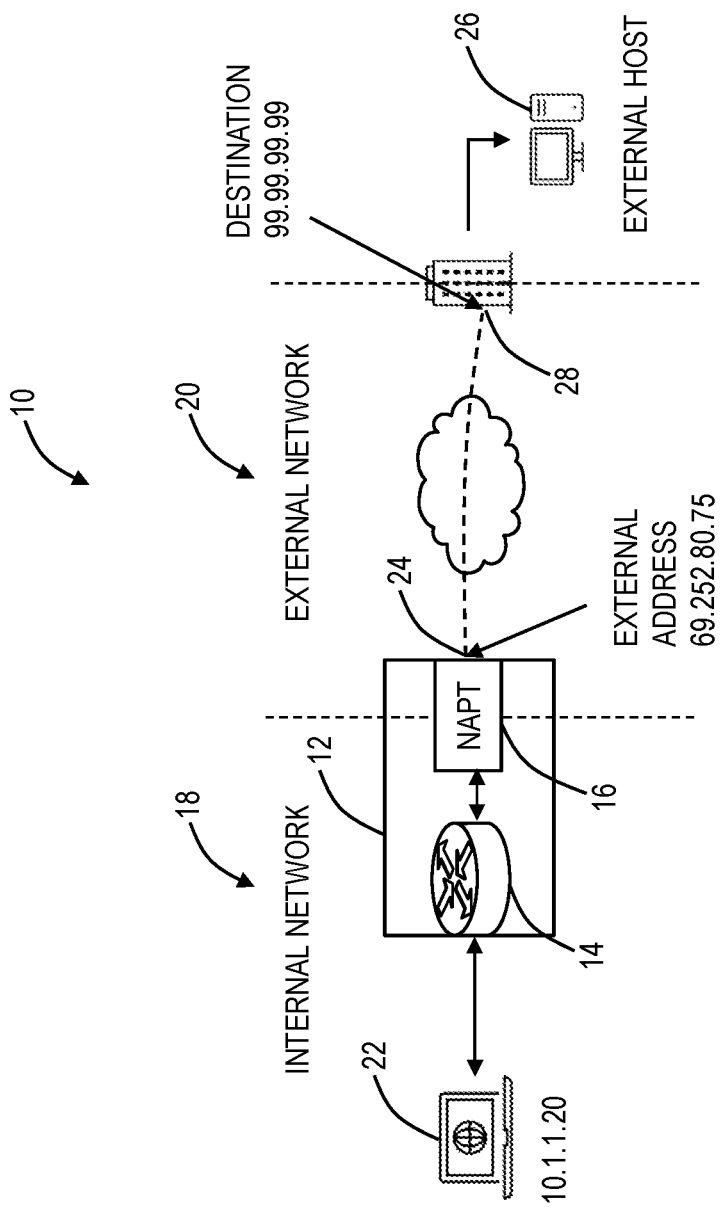
FIG. 1 is a network diagram of a network illustrating routing and NAPT through a routing device.

FIG. 1 is a network diagram of a network 10 illustrating routing and NAPT through a routing device 12. The routing device 12 includes a router 14 and a NAPT block 16. The routing device 12 can include an SD-WAN device, physical hardware, etc., and it is between an internal network 18 and an external network 20. The router 14 is configured to perform routing functions, and the NAPT block 16 is configured to perform network translation functions. The router 14 and/or the NAPT block 16 can be circuitry and/or one or more processors configured to execute instructions. Of note, while described as a NAPT block 16, the NAPT block can also perform only NAT functions in some embodiments.

In the example of FIG. 1, there is a host 22 on the internal network 18 connected to the routing device 12 and having an IP address of 10.1.1.20 on the internal network 18. At an external interface 24 of the routing device 12, the host 22 has an external IP address of 69.252.80.75 based on a session in the NAPT block 16. Those skilled in the art will appreciate the terms interface and ports may be used interchangeably herein, and each represents a physical network connection. The host 22 can have a session with an external host 26 that is connected to a destination interface 28 having an IP address of 99.99.99.99 on the external network 20.

FIG. 1 is presented for illustration purposes to show the mechanics of NAT/NAPT. Of note, the host 22 has a different IP address on the internal network 18 from the external network 20, and the NAPT block 16 is configured to perform the IP address translation between the networks 18, 20. Also, the terms internal network 18 and external network 20 are meant solely for reference and illustration purposes.

Figure 2:
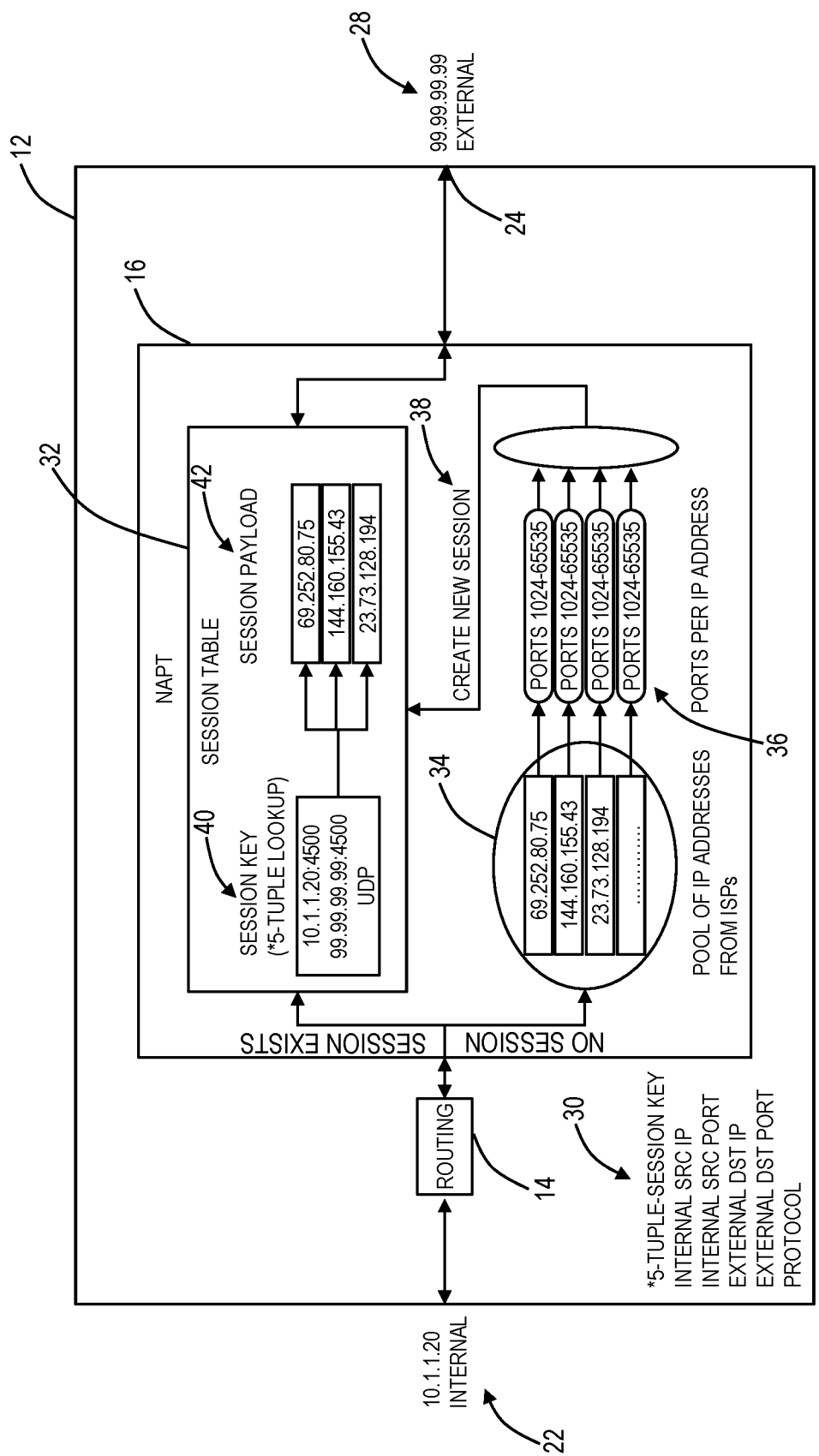
FIG. 2 is a block diagram illustrating functions associated with the routing device in the network of FIG. 1 in additional detail.

FIG. 2 is a block diagram illustrating functions associated with the routing device 12 in additional detail. Specifically, FIG. 2 illustrates the functionality of the router 14 and the NAPT block 16, in that order, for sending a packet from the host 22 to the destination interface 28. Again, the host 22 has an internal IP address of 10.1.1.20 on the internal network 18 and is configured to communicate with the destination interface 28, having an IP address of 99.99.99.99 on the external network.

When a first packet from the host 22 destined for the destination interface 28 comes to the NAPT block 16, the NAPT block 16 checks the packet with a session key 30 to see if a session exists. Since this is the first packet, no session exists in a session table 32 in the NAPT block 16, and the packet is assigned an IP address from a pool 34 of IP addresses assigned by ISPs as an external source address of the external interface 24 and an available port, 36 for each IP address in the range 1024-65535 is used as an external source port. A session is created (step 38) by the first packet where the NAPT block 16 does not find an existing session with the session key 30.

The new session is assigned its session key 30, which is stored in a lookup 40, and the NAPT block 16 includes a session payload block 42 that translates the IP address and port of the packet given the session key 30. That is, any packet identified via the corresponding session key 30 in the lookup 40 is assigned the corresponding IP address in the session payload block 42. In this example, a session key of 10.1.1.20:4500, 99.99.99.99:4500, UDP has the packet given an external IP address of 69.252.80.75.

The session key 30 can be a 5-tuple session key that is used for a subsequent lookup of the sessions for subsequent packets. The 5-tuple session key includes the internal Source (SRC) IP address (e.g., 10.1.1.20), the internal SRC port (e.g., 4500), the external Destination (DST) IP address (e.g., 99.99.99.99), the external DST port (e.g., 4500), and the protocol (e.g., User Datagram Protocol (UDP)).

FIG. 2 illustrates the routing device as a many (or one)-to-one configuration, i.e., there is a single external interface 24. Here, the IP address of the external interface 24 can be any one of the IP addresses in the pool 34 of IP addresses, and it is still possible for the external host 26 to reach the host 22.

Figure 3:
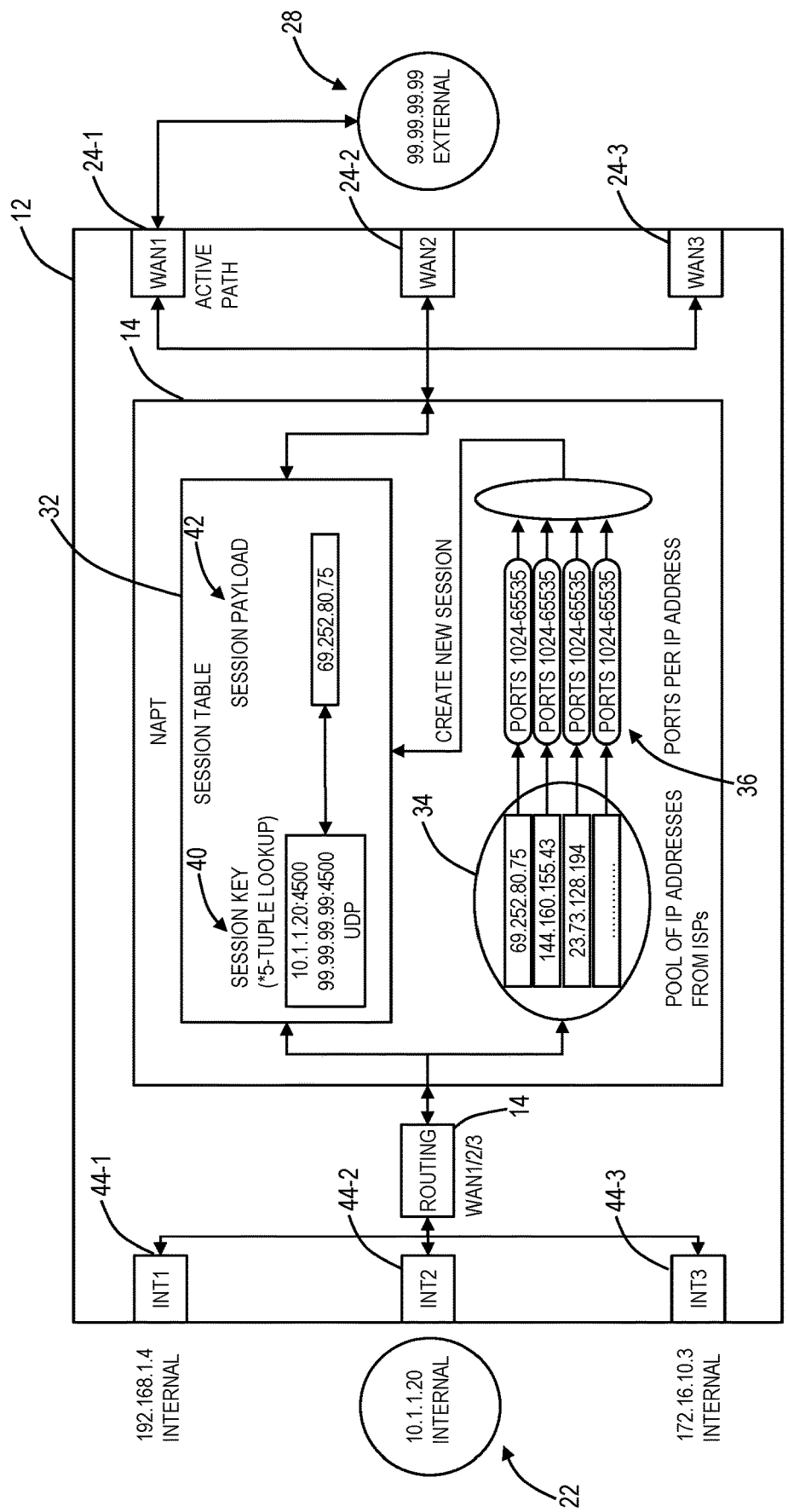
FIG. 3 is a block diagram of the routing device in an SD-WAN configuration having multiple internal interfaces and multiple external interfaces.

FIG. 3 is a block diagram of the routing device 12 in an SD-WAN configuration having multiple internal interfaces 44-1, 44-2, 44-3 and multiple external interfaces 24-1, 24-2, 24-3. However, in SD-WAN, e.g., it is possible to have multiple external interfaces 24-1, 24-2, 24-3 to the external network 20, as well as multiple internal interfaces 44-1, 44-2, 44-3 to the internal network 18. The different IP addresses in the pool 34 are for different external interfaces 24-1, 24-2, 24-3. In this example, IP address 69.252.80.75 is for the external interface 24-1, IP address 144.160.155.43 is for the external interface 24-2, and the IP address 23.73.128.194 is for the external interface 24-3. The SD-WAN configuration can be referred to as a many-to-many configuration, i.e., multiple internal interfaces 44-1, 44-2, 44-3 to multiple external interfaces 24-1, 24-2, 24-3.

Also, in this example, there is a session between the host 22 and the destination interface 28 using the external interface 24-1 as the active path. This session is assigned the IP address 69.252.80.75 for the external interface 24-1 from the NAPT block 16.

With multiple paths to the destination interface 28 and an active path in SD-WAN, NAPT/NAT sessions need to stick with the active path and also maintain dynamic IP and port translations based on the active path. Dynamic translations are required as a Dynamic Host Configuration Protocol (DHCP) server for an Internet Service Provider (ISP) can assign a new IP address or change the existing IP address of any WAN interface (external interface 24). The session key 30 is independent of the active path to the destination interface 28, which is via the external interface 24-1 in FIG. 3.

Figure 4:
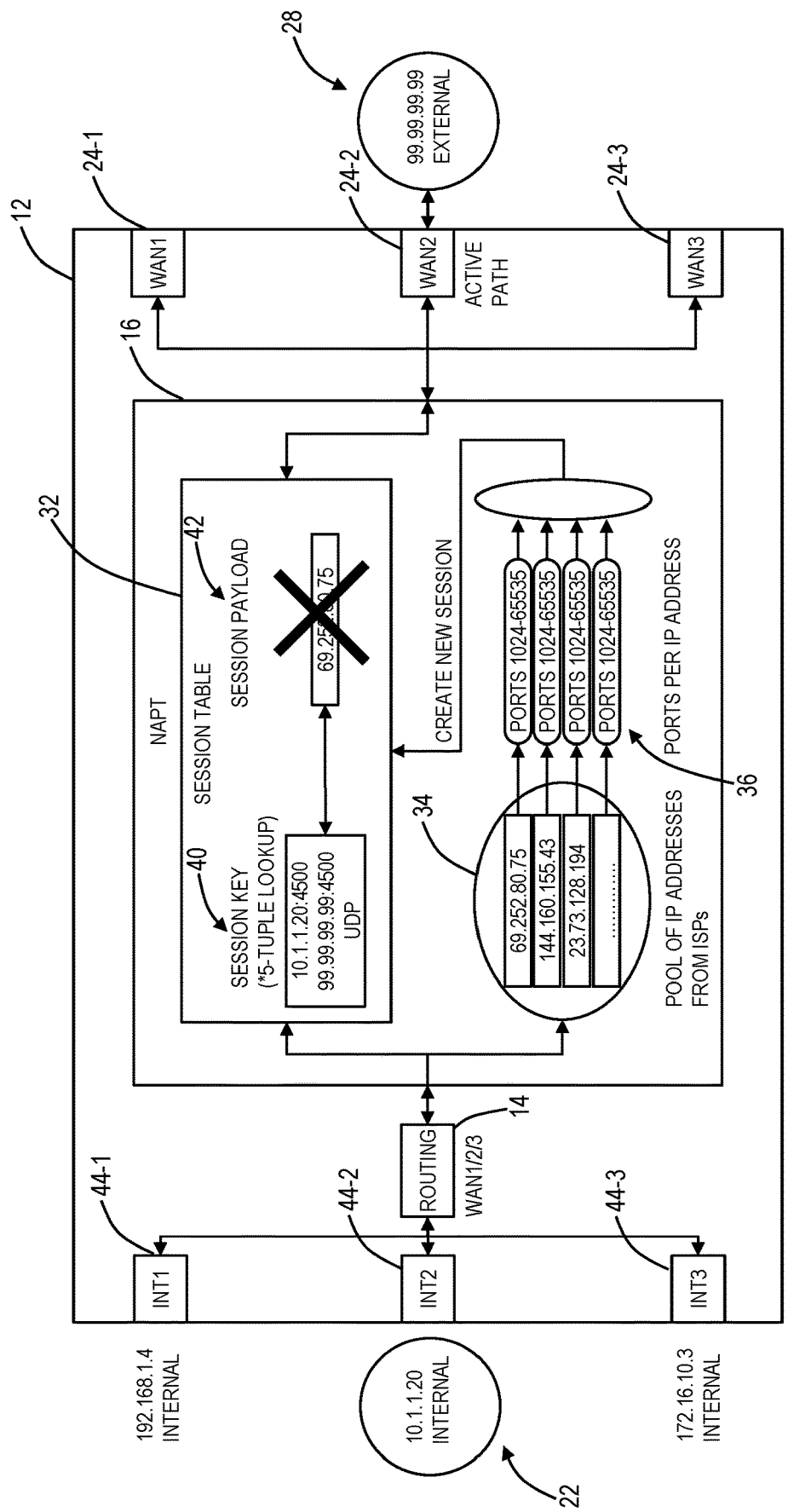
FIG. 4 is a block diagram of the routing device in the SD-WAN configuration from FIG. 3 illustrating switching of the active path to the destination interface via a different ISP or external interface.

FIG. 4 is a block diagram of the routing device 12 in the SD-WAN configuration from FIG. 3 illustrating switching of the active path to the destination interface 28 via a different ISP or external interface 24-2. An active path to the destination interface 28 could change because of factors such as a link down or a new preferred path via a specific egress interface holding an IP address from a specific ISP. The session key 30 is unique and independent of the path to the destination interface. In FIG. 3, the session is assigned the IP address 69.252.80.75 for the external interface 24-1, and this remains in the session payload 42 for this session in FIG. 4 after the active path changes to the external interface 24-2.

Thus, for subsequent packets in this session, the NAPT block 16 picks a previously existing session (for translations) that is incorrect for the current path as shown in FIG. 4. Also, there can be multiple sessions existing because of a frequent path switch over from many internal hosts 22 to many destinations. This can cause unpredictable behavior such as an outgoing packet with incorrect source public IP address or depletion of memory resources with a huge number of stale sessions existing when a path to destination switches over to another until the timers (typically in minutes) clear the sessions.

Figure 5:
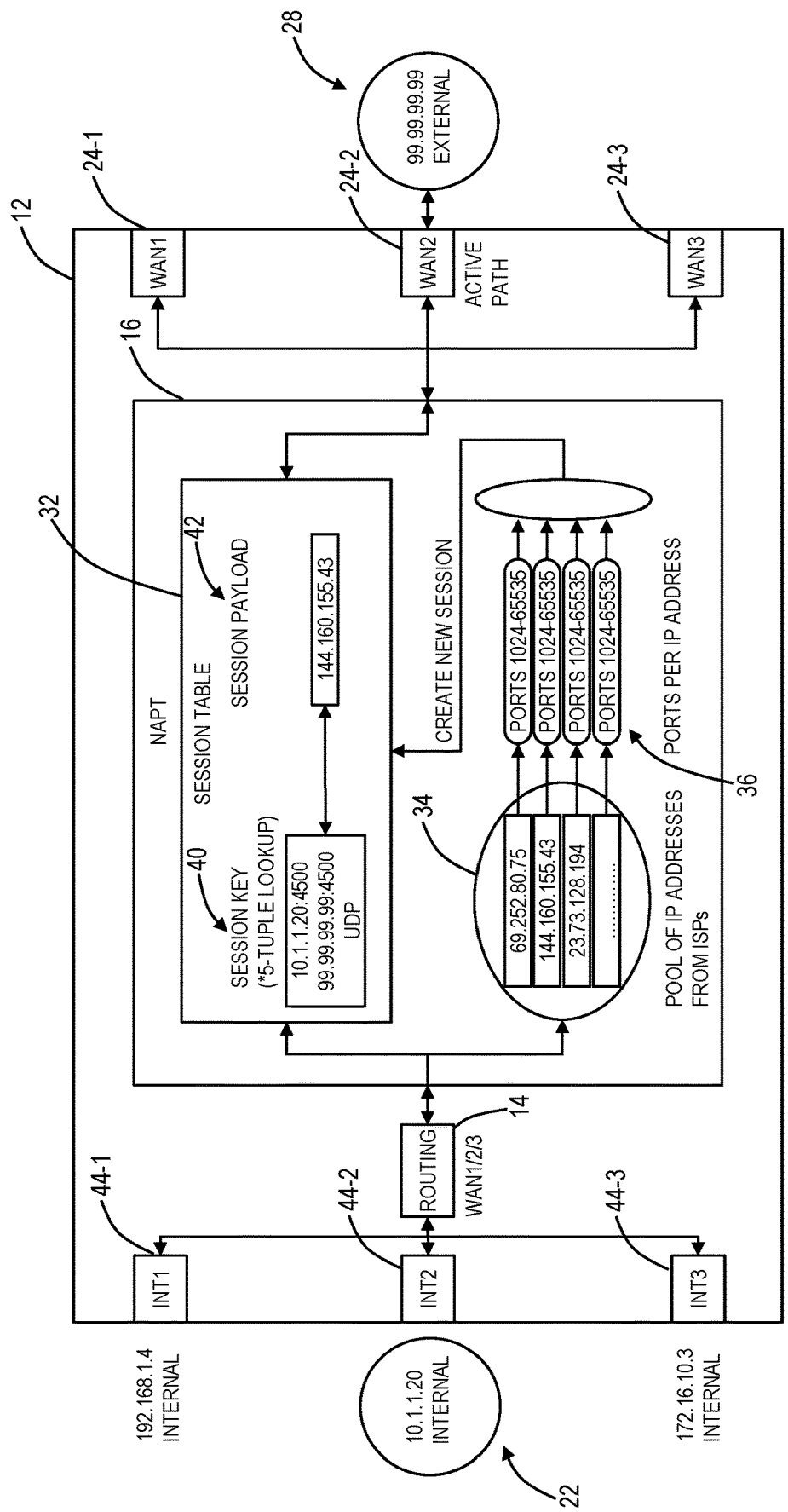
FIG. 5 is a block diagram of the routing device in the SD-WAN configuration from FIG. 3 illustrating switching of the active path to the destination interface via a different ISP or external interface, with a NAPT session update during a path switchover.

FIG. 5 is a block diagram of the routing device 12 in the SD-WAN configuration from FIG. 3 illustrating switching of the active path to the destination interface 28 via a different ISP or external interface 24-2, with a NAPT session update during a path switchover. Here, similar to FIG. 4, the active path has switched to the external interface 24-2. However, in FIG. 5, the session payload block 42 for the session is updated with the new IP address of the external interface 24-2, namely 144.160.155.43.

Figure 6:
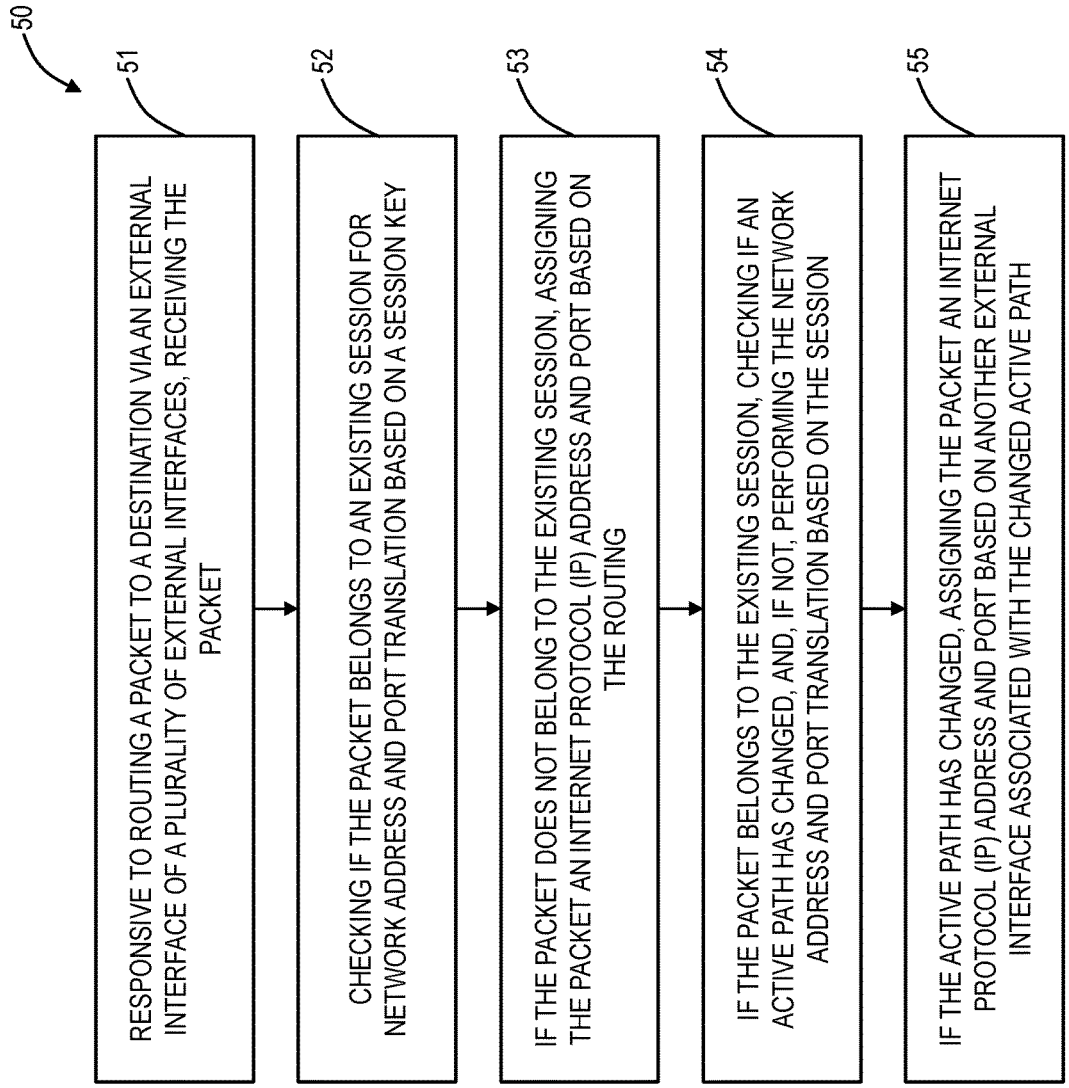
FIG. 6 is a flowchart of a process for path-aware NAPT session management with multiple paths and priorities.

FIG. 6 is a flowchart of a process 50 for path-aware NAPT session management with multiple paths and priorities. The process 50 can be implemented as a method with steps, via an apparatus such as an SD-WAN routing device, VNF, router, etc. that is configured to implement the steps, and as a non-transitory computer-readable medium having instructions stored thereon for programming a device to perform the steps.

The steps include, responsive to routing a packet to a destination via an external interface of a plurality of external interfaces, receiving the packet (step 51); checking if the packet belongs to an existing session for network address and port translation based on a session key (step 52); if the packet does not belong to the existing session, assigning the packet an Internet Protocol (IP) address and port based on the routing (step 53); if the packet belongs to the existing session, checking if an active path has changed, and, if not, performing the network address and port translation based on the session (step 54); and, if the active path has changed, assigning the packet an Internet Protocol (IP) address and port based on another external interface associated with the changed active path (step 55).

The steps can further include maintaining a list of IP addresses as a pool. A network address and port translation process maintains a list of public IP addresses assigned as the pool. Each IP address maintains a list of available ports for translation at any point in time which also means it maintains a list of ports that are already in use. A packet from the internal network 18 to the external network 20 may take one of the multiple paths to the destination interface 28 based on routing. NAPT that happens after routing will account the routing decision and the subnet of the egress interface 24, before looking for an available port for translation. This means the process checks if a translated external source address belongs to the egress interface. A port (for an external source address) is marked as being used after the translation for the life of a NAPT session. A change of public IP address from an ISP via a DHCP server will trigger an event to update the list of public IP addresses maintained in the NAPT pool.

The checking if the active path has changed can include comparing the external interface in the session with the external interface from the routing with a mismatch indicative of the changed active path. The steps can further include, if the active path has changed for a second existing session and if no subsequent packets are received for the second session, performing no action on the second existing session until it is stale. The present disclosure includes a session management scheme corresponding when a path switchover happens, such as from FIG. 3 to FIG. 5. The solution proposes to dynamically update the "specific stale NAT session" when a change in route is detected upon the arrival of the next packet corresponding to the session. A session key is not altered to minimize memory requirements. If a NAT session has already been created, then the unique session information (which is stale with a path switchover) is retrieved and the external source address in the NAT session entry is compared against the address of the egress interface determined by routing. If they do not match, a NAT session is deemed stale and falls back to the step 55 that picks the external source address meaningfully (matching egress interface) from the pool of IP addresses and available ports.

The active path can be changed based on any of a link being down and a new preferred path being determined in the routing. The device can be a Software-Defined Wide Area Networking (SD-WAN) routing device. The SD-WAN routing device can be a many-to-many device having a plurality of internal interfaces and the plurality of external interfaces. The SD-WAN routing device can be a one-to-many device having an internal interface and the plurality of external interfaces. The SD-WAN routing device can be a many-to-one device having a plurality of internal interfaces and one active interface of the plurality of external interfaces.

In another embodiment, an apparatus 12 includes one or more internal interfaces 44; a plurality of external interfaces 24; a routing block 14 connected to the one or more internal interfaces; and a network address and port translation block 16 connected to the routing block and the plurality of external interfaces, wherein the network address and port translation block is configured to, responsive to routing, by the routing block, a packet to a destination via an external interface of a plurality of external interfaces, receive the packet, check if the packet belongs to an existing session for network address and port translation based on a session key, if the packet does not belong to the existing session, assign the packet an Internet Protocol (IP) address and port based on the routing, if the packet belongs to the existing session, check if an active path has changed, and, if not, perform the network address and port translation based on the session, and if the active path has changed, assign the packet an Internet Protocol (IP) address and port based on another external interface associated with the changed active path.

Figure 7:
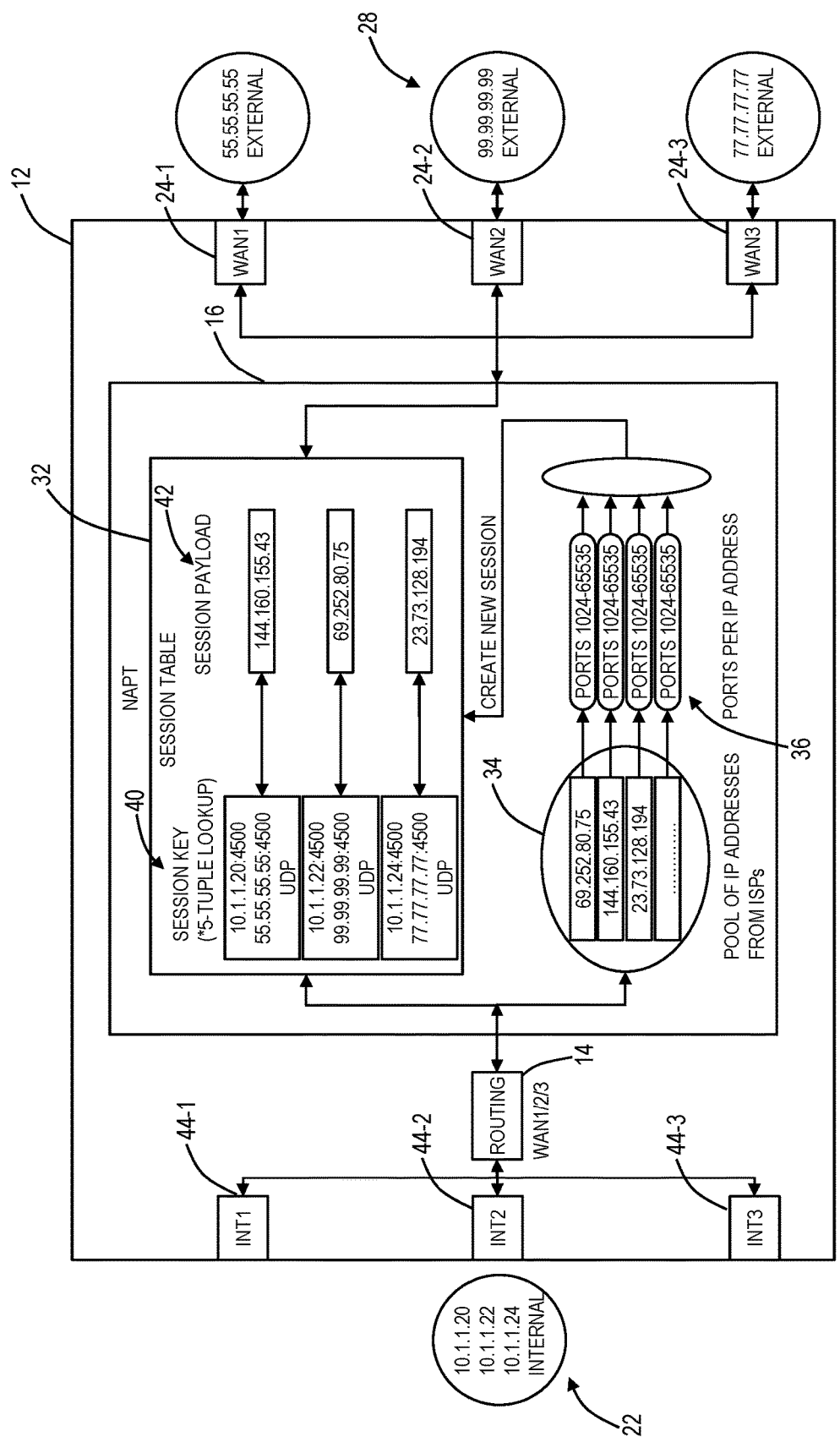
FIG. 7 is a block diagram of the routing device in the SD-WAN configuration from FIG. 5 illustrating one-to-many sessions from the same internal subnet to different external subnets.
Figure 8:
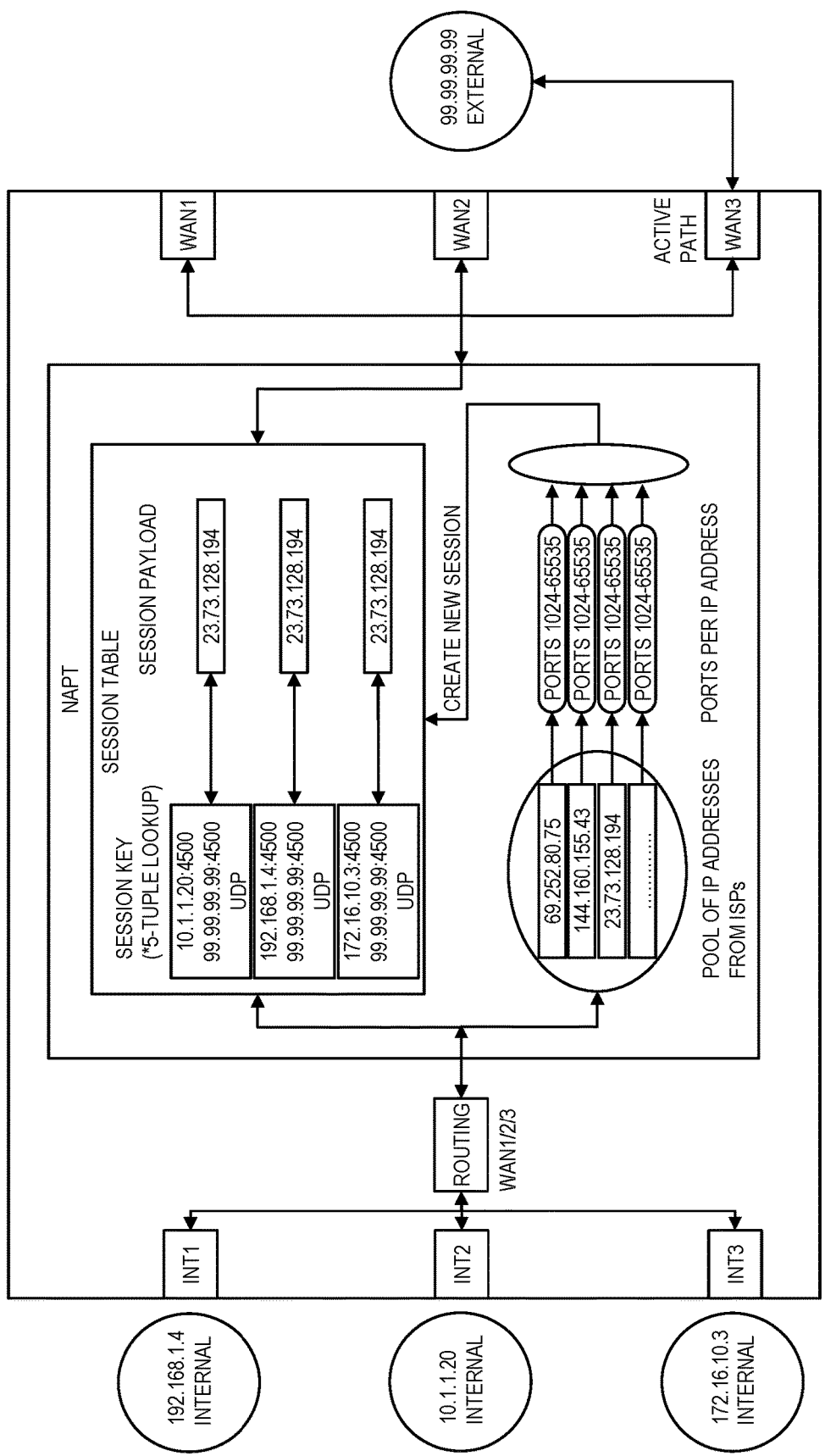
FIG. 8 is a block diagram of the routing device in the SD-WAN configuration from FIG. 5 illustrating many-to-one sessions from the same internal subnet to different external subnets.

The process 50 and associated session management supports one-to-many and many-to-one deployments either from/to same or different subnets as shown in FIGS. 7-8. FIG. 7 is a block diagram of the routing device 12 in the SD-WAN configuration from FIG. 5 illustrating one-to-many sessions from the same internal subnet to different external subnets. FIG. 8 is a block diagram of the routing device 12 in the SD-WAN configuration from FIG. 5 illustrating many-to-one sessions from the same internal subnet to different external subnets. FIG. 7 shows one-to-many sessions from 10.1.1.0 subnet to different external subnets reachable via different egress interfaces. NAT sessions show a corresponding external source address based on the path to the destination. FIG. 8 shows many-to-one sessions from different internal subnets to the same destination. NAT sessions show a corresponding external source address based on the active path to the destination.

The present disclosure allows a many-to-many mapping of hosts from any internal subnet to any external subnet keeping the memory requirements same and re-establishing only specific NAT sessions that are stale with active traffic flowing between the hosts.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a device to perform steps of:
  responsive to routing a packet to a destination via an external interface of a plurality of external interfaces, receiving the packet;

checking if the packet belongs to an existing session for network address and port translation based on a session key;

if the packet does not belong to the existing session, assigning the packet an Internet Protocol (IP) address and port based on the routing;

if the packet belongs to the existing session, checking if an active path has changed, and, if not, performing the network address and port translation based on the session; and if the active path has changed, assigning the packet an Internet Protocol (IP) address and port based on another external interface associated with the changed active path.

2. The non-transitory computer-readable medium of claim 1, wherein the steps further include maintaining a list of IP addresses as a pool.

3. The non-transitory computer-readable medium of claim 1, wherein the checking if the active path has changed includes comparing the external interface in the session with the external interface from the routing with a mismatch indicative of the changed active path.

4. The non-transitory computer-readable medium of claim 1, wherein the steps further include
if the active path has changed for a second existing session and if no subsequent packets are received for the second session, performing no action on the second existing session until it is stale.

5. The non-transitory computer-readable medium of claim 1, wherein the active path is changed based on any of a link being down and a new preferred path being determined in the routing.

6. The non-transitory computer-readable medium of claim 1, wherein the device is a Software-Defined Wide Area Networking (SD-WAN) routing device.

7. The non-transitory computer-readable medium of claim 6, wherein the SD-WAN routing device is a many-to-many device having a plurality of internal interfaces and the plurality of external interfaces.

8. The non-transitory computer-readable medium of claim 6, wherein the SD-WAN routing device is a one-to-many device having an internal interface and the plurality of external interfaces.

9. The non-transitory computer-readable medium of claim 6, wherein the SD-WAN routing device is a many-to-one device having a plurality of internal interfaces and one active interface of the plurality of external interfaces.

10. A method comprising:
responsive to routing a packet to a destination via an external interface of a plurality of external interfaces, receiving the packet;

checking if the packet belongs to an existing session for network address and port translation based on a session key;

if the packet does not belong to the existing session, assigning the packet an Internet Protocol (IP) address and port based on the routing;

if the packet belongs to the existing session, checking if an active path has changed, and, if not, performing the network address and port translation based on the session; and if the active path has changed, assigning the packet an Internet Protocol (IP) address and port based on another external interface associated with the changed active path.

11. The method of claim 10, further comprising maintaining a list of IP addresses as a pool.

12. The method of claim 10, wherein the checking if the active path has changed includes comparing the external interface in the session with the external interface from the routing with a mismatch indicative of the changed active path.

13. The method of claim 10, further comprising
if the active path has changed for a second existing session and if no subsequent packets are received for the second session, performing no action on the second existing session until it is stale.

14. The method of claim 10, wherein the active path is changed based on any of a link being down and a new preferred path being determined in the routing.

15. The method of claim 10, wherein the method is implemented via a Software-Defined Wide Area Networking (SD-WAN) routing device.

16. An apparatus comprising:
one or more internal interfaces;
a plurality of external interfaces;
a routing block connected to the one or more internal interfaces; and
a network address and port translation block connected to the routing block and the plurality of external interfaces, wherein the network address and port translation block is configured to
responsive to routing, by the routing block, a packet to a destination via an external interface of a plurality of external interfaces, receive the packet,
check if the packet belongs to an existing session for network address and port translation based on a session key,
if the packet does not belong to the existing session, assign the packet an Internet Protocol (IP) address and port based on the routing,
if the packet belongs to the existing session, check if an active path has changed, and, if not, perform the network address and port translation based on the session, and
if the active path has changed, assign the packet an Internet Protocol (IP) address and port based on another external interface associated with the changed active path.

17. The apparatus of claim 16, wherein the network address and port translation block is configured to maintain a list of IP addresses as a pool.

18. The apparatus of claim 16, wherein the active path has changed based on comparing the external interface in the session with the external interface from the routing with a mismatch indicative of the changed active path.

19. The apparatus of claim 16, wherein the network address and port translation block is configured to
if the active path has changed for a second existing session and if no subsequent packets are received for the second session, performing no action on the second existing session until it is stale.

20. The apparatus of claim 16, wherein the active path is changed based on any of a link being down and a new preferred path being determined in the routing.

* * * * *